Feb. 11, 1958     T. G. HARE     2,823,006
VALVE STRUCTURE
Filed March 23, 1955
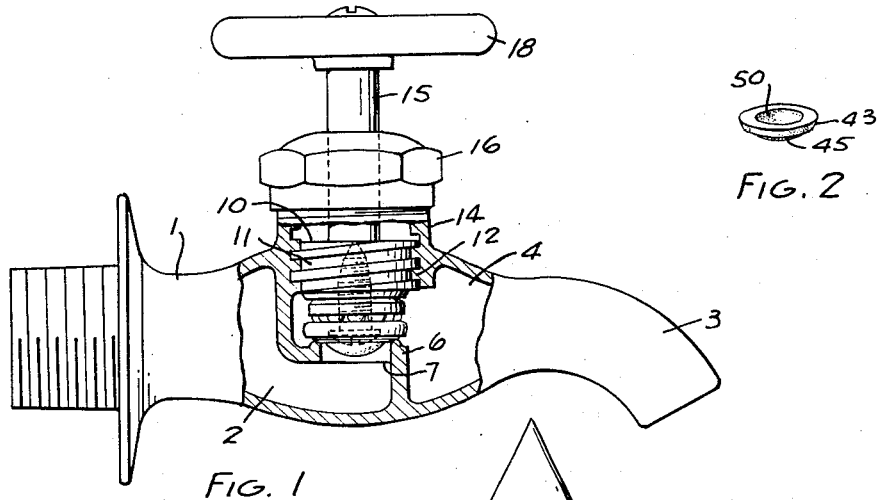
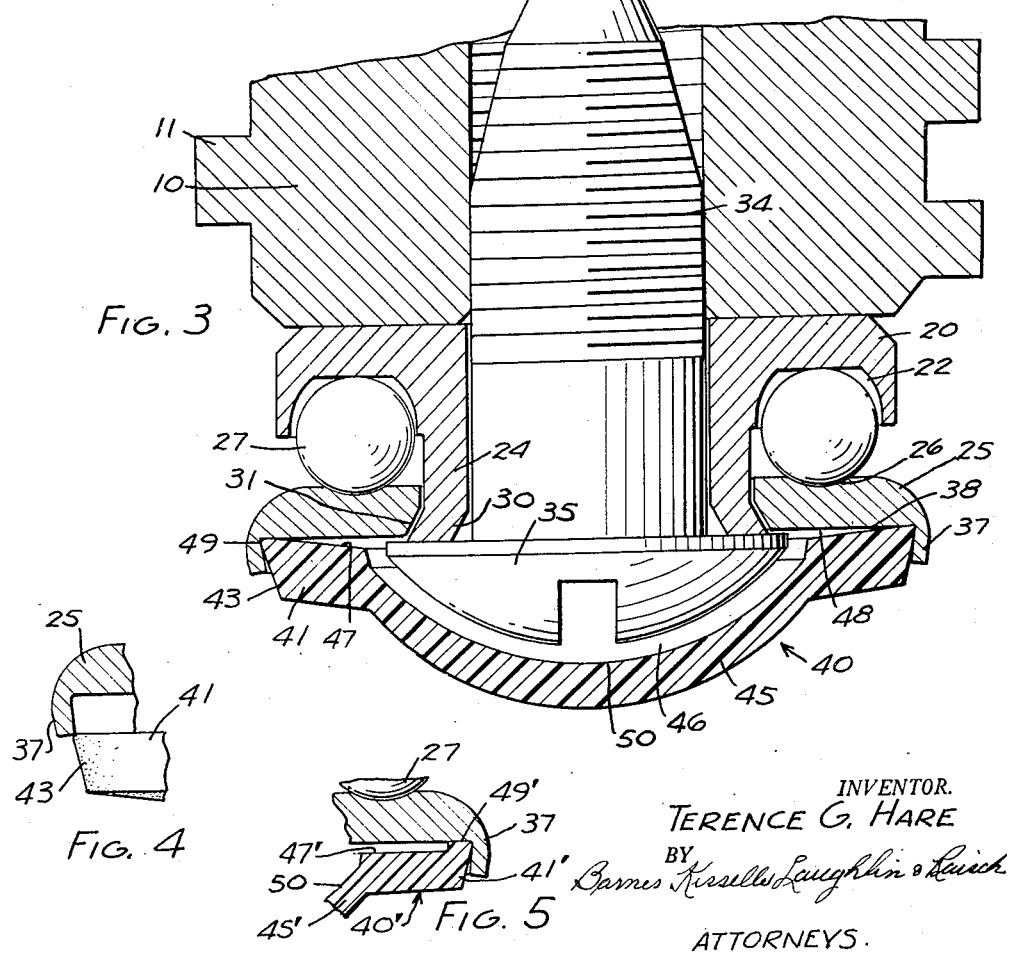
INVENTOR.
TERENCE G. HARE
BY
ATTORNEYS.

United States Patent Office 2,823,006
Patented Feb. 11, 1958

2,823,006

VALVE STRUCTURE

Terence G. Hare, Detroit, Mich.

Application March 23, 1955, Serial No. 496,163

6 Claims. (Cl. 251—88)

This invention relates to a valve structure and particularly a structure suitable for use as a faucet.

The structure of a valve made in accordance with this invention is one wherein the sealing member, for engaging and sealing an opening defined by a valve seat, is rotatably mounted on a valve stem which is turned on a threaded mounting for shift of the sealing member toward and away from the seat. When the valve member engages the seat, it is pressed thereagainst with relative rotation occurring between the seal member and the stem, with the result that the seal member is not rotated on the valve seat.

The objects of the invention are to provide a novel arrangement of seal member together with its mounting, to insure a fluid tight seal when the valve is closed, to provide a structure of such long life that in some cases, at least, the seal member may not need to be replaced for practically the life of the valve itself or other metal parts thereof. At the same time, a seal member is provided which may be employed with a headed screw, and the seal member is so constructed that it may be snapped into position during assembly and which will remain assembled indefinitely, the mounting and connection thereof not being deleteriously affected by the heat of hot water or pressure of water. Other objects and advantages will appear as the detailed description is considered.

Fig. 1 is a general view with some parts cut away and some parts in section illustrating a form of faucet with the structure of the invention embodied therein.

Fig. 2 is a perspective view of the seal member.

Fig. 3 is an enlarged cross sectional view of the rotatable mounting and the seal member assembled therewith.

Fig. 4 is a detailed view partly in section illustrating the relationship of parts during assembly.

Fig. 5 is a detailed view in section illustrating a modified form of the invention.

The valve is generally shown herein as being in the form of a faucet, such as the ordinary faucet used in the plumbing systems of commercial and domestic buildings, and it has a body 1 with an inlet passage 2 and a spigot or outlet end 3 with an outlet passage 4. A valve seat 6 defines a port 7 situated between the inlet passage 2 and outlet passage 4.

The valve member 10 has a body with external threads 11 with a threaded engagement with internal threads 12 in an extension 14 on the body. Extending from the valve body is a stem 15 which projects through a suitable cap 16 and the stem may have an operating handle 18. Suffice it to say, that as the handle is turned, the valve member is rotated and retracted from the valve seat 6 or moved toward the valve seat 6 depending upon the direction of rotation.

The seal member for engaging the seat 6 is mounted on the valve member through the means of a bearing construction which permits of relative rotation between the valve member and the seal member. This structure is shown in enlarged form in Fig. 3. In this form, an anti-friction bearing structure is shown. It is in the form of an upper race member 20 arranged to seat against the end of the valve member 10 and provided with an annular raceway 22. This race member has a central hub portion or collet 24.

A lower race member is provided with a raceway 26 and an annular array of ball bearings 27 is disposed in the raceways and located between the upper and lower race members. The race member 25 has a central opening therein and the collet 24 extends therethrough. The material forming the edge of the collet is fashioned outwardly as shown at 30 so as to overlie an angular face 31 of the lower race member and thus secure the race members together. The outwardly flared part 30 may be formed to project outwardly by a punch and die operation or by a spinning operation. While the two race members are thus secured together the connection is sufficiently loose to provide a running clearance so that the raceways are relatively rotatable while, at the same time, with sufficient tightness to hold the annulus of balls in position in the raceways.

The extreme end of the collet projects sufficiently through the lower raceway 25 so that the end thereof may, as Fig. 3 is viewed, project downwardly relative to the underface of the raceway 25 while still allowing freedom of rotation of the annulus of balls.

This anti-friction bearing structure is secured to the end of the valve member as by means of a screw having a threaded portion 34 which is threaded into the valve body. The rounded head of the screw is indicated at 35 and it will be seen that the screw may be tightened in position to thus engage the end of the collet 24 and hold the upper race member tightly and permanently engaged between the screw head and the end of the valve member. Thus tightening of the screw does not interfere with the free rotation of the lower race member 25. The screw is preferably of the self-tapping type with a pointed or so-called diamond point 36. There is some variation in the threads of valves, and for replacement purposes, the self-tapping screw may be employed with several threads of valves already in use where the threads are of different pitches and even some slight difference in diameter.

The lower race member 25 has an annular rim 37 which projects downwardly, as Fig. 3 is viewed, from the under face 38, thus forming a shallow recess. The rim 37 is formed so that it extends, as Fig. 3 is viewed, downwardly and inwardly thus forming, so to speak, a re-entrant recess. The inside peripheral face of the annular rim 37 thus converges downwardly so that the entrance to the recess has a diameter somewhat smaller than the diameter of the recess measured at the face 38. For example, the diameter across the edge of the rim may be about .005 inch less than the largest diameter of the re-entrant recess. This, of course, may vary, particularly in variation of sizes of parts for different size valves. The inclination of the inner peripheral surface of the rim may be about 10° from the axis of the screw but this again may be varied within the metes and bounds of the invention.

The seal member is generally indicated at 40. It preferably is of the plastic known as nylon although other materials and plastics may be employed, such as rubber, natural or synthetic, Saran and some polyethylenes, all of which may be generally described herein as plastic materials. It is formed with a base 41 annular in form, the peripheral edge of which is inclined as at 43 on an angle preferably slightly greater than the angle of the inner peripheral face of the rim 37. The maximum diameter of the base, however, is in excess of the minimum diameter across the rim 37. The central portion of the seal member which lies within the annular base 41 is of concavo-convex form as indicated at 45 thus defining a cavity 46 for the head 35 of the screw. The cavity is sufficiently large in order to provide clearance with respect to the screw so that the seal member and the lower race may turn while the screw remains stationary. The annular base of the seal member is formed on an angle, as shown at 47, to provide clearance 48 with respect to the underside of the lower race and thus the extreme edge 49 seats on the lower race substantially in the annular corner between the body of the race and the annular flange 37.

In the modified form of Fig. 5, the change is in the seal member and other parts have the same reference characters applied. In this form the seal member 40' has an annular base portion 41' and the upper surface thereof at 47' is formed in a different plane than, or offset form, the upper peripheral edge 49'. The peripheral edge 49' seats against the lower race, as shown, while the surface 47' is spaced therefrom to provide for flexing of the seal member.

In making the assembly the seal member may be located relative to the lower race in a manner somewhat as indicated in Fig. 4, and then by the application, in a suitable manner, of pressure, the base 41 is caused to be snapped into the re-entrant recess. The concavo-convex form of the central portion of the seal member facilitates snapping it into the lower race as the central portion yields to permit flexing of the annular base portion 41. When the seal member is thus snapped into position it is mounted, as shown in Fig. 3, and is securing and strongly held in the re-entrant recess of the lower race member. The surface 50 is spaced from the head of the screw so that the seal member will not contact the same when the seal member is flexed in use.

With this mounting the seal member remains securely engaged under all conditions. If it be subjected to heat, as from hot water, the seal member expands and thus becomes tighter in its mounting. When made of nylon it does not become embrittled and will remain resilient. The race members, the balls, and the screw are preferably of corrosion resisting metal and in this connection the raceways are preferably brass, of a composition suitable for the purpose, while the balls are preferably of stainless steel and the screw is of non-corrosive heat treated steel.

The seal member is preferably die formed and normally retains the shape shown in Fig. 3 so that the clearance 48 is normally maintained. When the valve is closed and the seal member is urged against the valve seat, the underface of the annular body portion 41 makes contact with the seat. As closing pressure is applied, the seal member flexes which it is permitted to do as the clearance 48 is lessened or reduced by the flexing of the seal member. In this connection, a seal member of nylon is not as soft or pliable as a seal member made of conventional rubber composition but the yielding action, which is permitted by the clearance, allows the sealing member to seat firmly upon the valve seat throughout its periphery. The seal member will effectively seat upon and close a valve where the valve seat is inaccurately formed or, in other words, where the valve seat is not entirely square with the axis. In doing this, the seal member may flex more at one location of the annular base member than another. The modified form functions in the same manner.

I claim:

1. A bearing and seal assembly for a valve comprising, an upper race member, a lower race member, an annulus of balls between the race members, a headed screw passing through the race members and adapted to fixedly secure the upper race member to a valve member, the lower race member having an annular rim defining a shallow recess, the rim being formed so that the diameter of the recess at its entrance is less than the diameter inwardly of the recess, a seal member having an annular base portion with a diameter greater than that at the opening of the recess and a central portion of concavo-convex form surrounded by said annular base portion, the seal member adapted to yield and to be snapped into the recess with the concavo-convex central portion enclosing the head of the screw with clearance, the upper face of the annular base portion being inclined so that it seats on the lower race member substantially at its upper annular edge, and the upper surface thereof diverges from the surface of the lower race member in a radially inward direction to said central portion, whereby the seal member may flex when urged against a valve seat.

2. A bearing and seal assembly for a valve comprising, an upper race member, a lower race member, an annulus of balls between the race members, a headed screw passing through the race members and adapted to fixedly secure the upper race member to a valve member, the lower race member having an annular rim defining a shallow recess, the rim being formed so that the diameter of the recess at its entrance is less than the diameter inwardly of the recess, a seal member having an annular base portion having a maximum diameter which is substantially the same as the maximum diameter of the recess and a concavo-convex central portion surrounded by said annular base portion for covering the head of the screw with clearance, the upper face of the annular base having an annular outer edge portion for seating against the lower race member and face portions extending inwardly therefrom to said central portion and spaced from the lower race member, whereby the seal member may flex when urged against a seat.

3. A bearing and seal assembly for a valve comprising, an upper race member, a lower race member, an annulus of balls between the race members, a headed screw passing through the race members and adapted to fixedly secure the upper race member to a valve member, the lower race member having an annular rim defining a shallow recess, the rim being formed so that the diameter of the recess at its entrance is less than the diameter inwardly of the recess, a seal member having an annular base portion having a maximum diameter which is substantially the same as the maximum diameter of the recess and a concavo-convex central portion surrounded by said annular base portion for covering the head of the screw with clearance, the upper face of the annular base having an annular outer edge portion for seating against the lower race member and an annular face portion extending inwardly from said outer edge to said central portion and offset from the annular edge portion to provide clearance with respect to the lower race member, whereby the seal member may flex when urged against a valve seat.

4. A bearing and seal assembly for a valve comprising, an upper race member, a lower race member, an annulus of balls between the race members, a headed screw passing through the race members and adapted to fixedly secure the upper race member to a valve member, the lower race having an annular rim forming a shallow recess with the internal surfaces of the rim converging toward the open end of the recess, whereby the recess is of reentrant form, a seal member of yieldable plastic such as nylon, having a base portion of annular form, the maximum diameter of which is substantially the same as the maximum diameter of the recess, and said base being adapted to be snapped into the recess by the yielding of the material thereof, the seal member having a concavo-convex central portion surrounded by said annular base portion and adapted to cover the head of the screw with clearance, the base portion being formed so that its upper annular edge is uppermost for seating against the lower race member substantially in the corner between the body of the lower race member and its annular rim, and having surfaces extending inwardly from said annular edge to said central portion which are spaced from the body of the lower race member, whereby the seal member may flex when urged against a valve seat.

5. The combination called for in claim 3 wherein the axially extending outer side wall of said annular base portion tapers radially inwardly from the upper face of the base portion to the lower face thereof, whereby the maximum diameter of said annular base portion is at the upper face of said base portion and the insertion of said base portion into the recess of said lower race member is facilitated.

6. The combination called for in claim 4 wherein the axially extending outer side wall of said annular base portion tapers radially inwardly from the upper face of the base portion to the lower face thereof, whereby the maximum diameter of said annular base portion is at the upper face of said base portion and the insertion of said base portion into the recess of said lower race member is facilitated.

References Cited in the file of this patent

UNITED STATES PATENTS

| | | |
|---|---|---|
| 2,203,684 | Hare | June 11, 1940 |
| 2,281,689 | Hare | May 5, 1942 |
| 2,572,623 | Stover | Oct. 30, 1951 |
| 2,613,907 | Stillwagon | Oct. 14, 1952 |
| 2,641,278 | Eplett | June 9, 1953 |